No. 720,585. PATENTED FEB. 17, 1903.
R. P. HOADLEY.
SAW REPAIRING DEVICE.
APPLICATION FILED MAY 27, 1901.
NO MODEL.
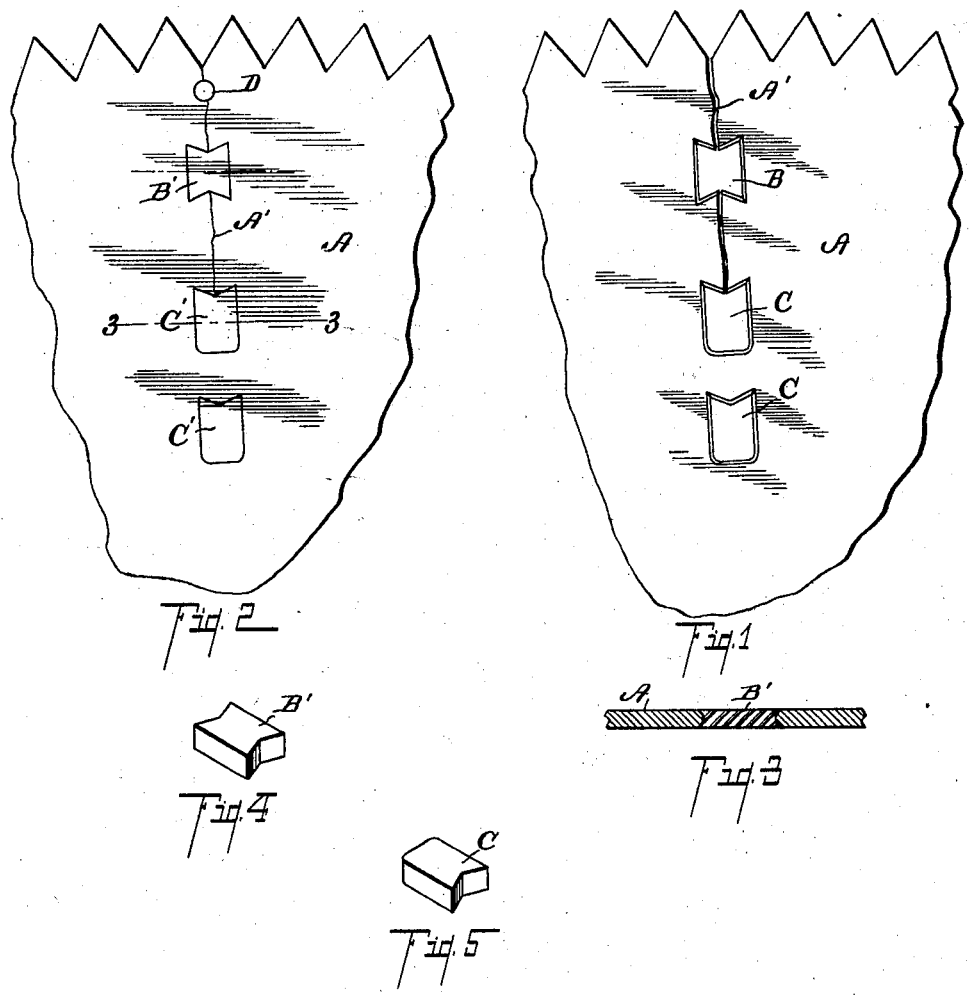
Witnesses:
Inventor,

UNITED STATES PATENT OFFICE.

RODNEY P. HOADLEY, OF THREEOAKS, MICHIGAN.

SAW-REPAIRING DEVICE.

SPECIFICATION forming part of Letters Patent No. 720,585, dated February 17, 1903.

Application filed May 27, 1901. Serial No. 62,053. (No model.)

*To all whom it may concern:*

Be it known that I, RODNEY P. HOADLEY, a citizen of the United States, residing at the village of Threeoaks, in the county of Berrien and State of Michigan, have invented certain new and useful Improvements in Saw-Repairing Devices, of which the following is a specification.

This invention relates to a repairing or joining device and is particularly well adapted for repairing saw-blades or any thin plates or articles where it is desired to draw a crack or parts together and retain them rigidly. It is an improvement upon the device shown in Patent No. 637,024, issued to Landon Penwell, dated November 14, 1899.

In practice it has heretofore been found that when a circular saw cracks it is necessary to cut the same down within the crack in order to utilize it further, making a smaller saw of the same, or else if the saw is already small it must be discarded.

The invention is also useful in repairing cracks in boilers or in machinery-plates and in positively and rigidly retaining them together.

The objects of this invention are to provide a simple and efficient means of repairing saw-blades or like plates wherein such means shall draw the parts together and securely and rigidly retain them without adding to the thickness or in any wise interfere with the future usefulness or operation of the same and to provide a preventive against the tendency to again crack in the same direction due to strain of the metal by the original breakage and to avoid an angular cut in the direction of the crack.

Further objects will definitely appear in the detailed description to follow.

I accomplish these objects of my invention by the devices and means described in this specification.

A structure embodying the features of my invention is fully illustrated in the accompanying drawings, forming a part of this specification, in which—

Figure 1 represents a portion of a saw-plate prepared to receive my improved mending keys or rivets, the crack in the plate being shown open. Fig. 2 shows the same portion of the saw-plate in which my improved mending keys or rivets have been inserted, showing that by the insertion of the same the break or crack will be closed. Fig. 3 is a detail transverse sectional view taken on line 3 3 of Fig. 2, showing the countersink formation. Fig. 4 is a perspective view of a main key or repairing device used by me. Fig. 5 is a perspective view of the auxiliary key or repairing device used in this connection and presenting the principal improvement.

In the drawings similar letters of reference refer to similar parts throughout the several views.

Referring to the lettered parts of the drawings, A represents a portion of a saw-blade. A' represents a crack in the same which my improved device is designed to repair.

In repairing the saw a double-dovetailed key B' is put in the slot or opening B, which is made toward the rim of the saw, the dovetails being each side of the crack and exactly opposite, as in the said Penwell patent. A key C' is riveted in a slot or opening C at the end of the crack. This slot is dovetail in form at the end toward the periphery of the saw or edge of plate and is preferably rectangular with rounded corners at the other end. It is found desirable to place one at least of the last-described keys in suitable opening farther toward the center of the saw in a line with the crack, the objects of which will be hereinafter stated. The openings are beveled around their edges on both sides of the saw-blade to form countersinks. A key B' is provided for the openings B, and keys C' for the openings C. These keys are of a size to fit the openings when the saw-crack is drawn together. Their sides are parallel and their thickness is somewhat greater than the saw-plate or article to be repaired. It will thus be seen that in driving the keys into the slots the crack is drawn together. After being so driven into position the keys are riveted into the countersunk portion, and any surplus is ground away, leaving the surface entirely smooth. It is found in practice desirable to place a key or rivet at the end of the crack and that there is a tendency when so doing, if a double-dovetailed slot, as B, is formed, for the saw or plate to crack in the direction of the points of the dovetails. I have discovered that the key-formed dovetailed shape at one end only is entirely effective and overcomes this objection. I have also found that to place another key in the direction in which the crack had taken overcomes any tendency of the saw to crack in the future, due to the weakening of the same by the crack therein previous to the repairing. This is a desirable step and is taken as a precaution. The other features will often be effective without it. Fig. 2 shows the key inserted in the opening and riveted down. I find that it is sometimes desirable to place a round rivet D in a suitable countersunk hole toward the periphery of the saw outside of the first key B', as this assists in preventing vibrations of the saw and enables the placing of the key B' a little farther from the periphery of the saw. The advantages of this are that the saw can be ground down to or past this rivet without in any manner affecting the repair devices. A saw thus repaired is of full strength, and it is impossible to displace the keys thus inserted. It is apparent that any number of keys may be used that may be desired, it being desirable, however, to use at least one of the keys B' toward the periphery of the saw and a key C' within the same, as the key B' is better adapted to close the crack or hold the parts together, the key C' having drawn sufficient to draw the crack in plates of medium thickness together.

I have described my improved repairing or joining device in connection with saw-plates. It is apparent, however, that the places where it can be utilized are too numerous to mention.

Having thus described my invention, what I claim as new, and desire to secure by Letters Patent, is—

1. A joint for saws or similar plates consisting of two or more openings formed by slots in the plates facing each other, the slots forming the outer opening being dovetailed and the slots forming the inner opening having their outer ends dovetailed and their inner ends formed square with rounded corners; keys dovetailed to fit into said slots to retain the plates together, the ends of which are riveted into suitable countersinks to retain the keys in place, for the purpose specified.

2. A joint for saws or similar plates formed by slots in the plates facing each other the outer ends of the slots being dovetailed and their inner ends formed square with rounded corners; a key dovetailed to fit into said slots to retain the plates together the ends of which are riveted into suitable countersinks to retain the keys in place.

3. A key for repairing saws or similar plates formed with a dovetail on one edge, the opposite edge being square with rounded corners as specified.

In witness whereof I have hereunto set my my hand and seal in the presence of two witnesses.

RODNEY P. HOADLEY. [L. S.]

Witnesses:
SARAH K. SAWYER,
WM. K. SAWYER.